US012359824B2

(12) United States Patent
Pankanti et al.

(10) Patent No.: US 12,359,824 B2
(45) Date of Patent: Jul. 15, 2025

(54) OVEN WITH STEAM COOKING FUNCTIONALITY AND DESICCANT TO REDUCE STEAM BACKFLOW OUT OF THE OVEN

(71) Applicant: WHIRLPOOL CORPORATION, Benton Harbor, MI (US)

(72) Inventors: Raakesh Pankanti, Hyderabad (IN); Karthik Sandhragiri, Hyderabad (IN); Harishkumar, Kalaburagi (IN)

(73) Assignee: Whirlpool Corporation, Benton Harbor, MI (US)

( * ) Notice: Subject to any disclaimer, the term of this patent is extended or adjusted under 35 U.S.C. 154(b) by 612 days.

(21) Appl. No.: 17/695,388

(22) Filed: Mar. 15, 2022

(65) Prior Publication Data

US 2023/0296257 A1 Sep. 21, 2023

(51) Int. Cl.
*F24C 15/00* (2006.01)
*A47J 27/04* (2006.01)
(Continued)

(52) U.S. Cl.
CPC ............. *F24C 15/003* (2013.01); *A47J 27/04* (2013.01); *B01D 53/0415* (2013.01);
(Continued)

(58) Field of Classification Search
CPC ....... A21B 3/04; A47J 27/04; A47J 2027/043; B01D 53/0415; B01D 53/261;
(Continued)

(56) References Cited

U.S. PATENT DOCUMENTS 5,525,782 A 6/1996 Yoneno et al.
6,001,249 A * 12/1999 Bailey .................... C02F 1/003 210/85
(Continued)

FOREIGN PATENT DOCUMENTS

CN 2199976 Y * 6/1995
CN 110833312 A 2/2020
(Continued)

OTHER PUBLICATIONS

CN 210930914 U—Translation (Year: 2020).*
CN 2199976 Y—Translation (Year: 1995).*
EP 2409571 A1—Translation (Year: 2012).*

*Primary Examiner* — Steven B McAllister
*Assistant Examiner* — Benjamin W Johnson
(74) *Attorney, Agent, or Firm* — Price Heneveld LLP

(57) ABSTRACT

An oven includes (a) a cooking chamber; (b) a steam generator in fluid communication with the cooking chamber, the steam generator configured to transform water into steam for delivery to the cooking chamber; (c) a water reservoir in fluid communication with the steam generator, the steam generator further configured to draw the water from the water reservoir to be transformed into the steam; (d) a water fill assembly in fluid communication with the water reservoir and configured to accept water from a source external to the oven that is subsequently deposited into the water reservoir; and (e) desiccant disposed in fluid communication between the water reservoir and the water fill assembly. The oven can include a filter assembly disposed in fluid communication between the water reservoir and the water fill assembly. The desiccant can be disposed within the filter assembly.

20 Claims, 9 Drawing Sheets

10 66 58 46 14 104 40b 98 100 96 44 42 94 102 56 40a 106 48 40c 48 82 74 76 78 86 92 90 70 72 68 90 92 84 80 88

(51) Int. Cl.

| | |
|---|---|
| ***B01D 53/04*** | (2006.01) |
| ***B01D 53/26*** | (2006.01) |
| ***B01D 53/28*** | (2006.01) |
| ***F22B 37/60*** | (2006.01) |
| *A21B 3/04* | (2006.01) |
| *F24C 15/02* | (2006.01) |
| *F24C 15/32* | (2006.01) |

(52) U.S. Cl.
CPC ........... *B01D 53/261* (2013.01); *B01D 53/28* (2013.01); *F22B 37/60* (2013.01); *A21B 3/04* (2013.01); *A47J 2027/043* (2013.01); *B01D 2253/102* (2013.01); *B01D 2253/106* (2013.01); *B01D 2257/80* (2013.01); *F24C 15/02* (2013.01); *F24C 15/327* (2013.01)

(58) Field of Classification Search
CPC .............. B01D 53/28; B01D 2253/102; B01D 2253/106; B01D 2257/80; F22B 37/60; F24C 15/003; F24C 15/02; F24C 15/327
USPC ........................................................ 126/19 R
See application file for complete search history.

(56) References Cited

U.S. PATENT DOCUMENTS

| | | | | |
|---|---|---|---|---|
| 10,401,036 | B2 | 9/2019 | Faraldi et al. | |
| 11,013,074 | B2 | 5/2021 | Guggenberger et al. | |
| 2018/0070757 | A1 * | 3/2018 | Lee | A23L 5/13 |

FOREIGN PATENT DOCUMENTS

| | | | | |
|---|---|---|---|---|
| CN | 210930914 | U * | 7/2020 | |
| DE | 102005063214 | A1 | 6/2007 | |
| EP | 0277337 | B1 | 9/1991 | |
| EP | 2409571 | A1 * | 1/2012 | F24C 15/327 |
| EP | 3437477 | A1 | 2/2019 | |
| JP | 2003262338 | A | 9/2003 | |

* cited by examiner

OVEN WITH STEAM COOKING FUNCTIONALITY AND DESICCANT TO REDUCE STEAM BACKFLOW OUT OF THE OVEN

BACKGROUND OF THE DISCLOSURE

The present disclosure generally relates to an oven, and more specifically, to an oven with steam cooking functionality with desiccant to limit or prevent steam backflow out of the oven.

Some ovens have the capability to cook a food item in the presence of steam. For example, some ovens include a water reservoir that the user can fill with liquid water (hereinafter, liquid water is referred to simply as "water" while water in a predominantly gaseous state is referred to as "steam"). The oven then transforms the water from the liquid reservoir into steam to deliver to a cooking chamber within which the food item is located during cooking thereof. However, there is a problem in that steam and water sometimes escape from the oven through the water reservoir and into an external environment during use of the oven, including when the user adds water to the water reservoir and when non-steam cooking functions of the oven are utilized.

SUMMARY OF THE DISCLOSURE

The present disclosure solves that problem with desiccant, which can be disposed within a filter assembly, disposed in fluid communication with the water reservoir. The desiccant captures steam, and otherwise acts as a physical barrier to the steam, attempting to backflow from the water reservoir out of the oven and into the external environment. However, the desiccant allows water added to the oven to flow into the water reservoir for use during the steam cooking function.

According to one aspect of the present disclosure, an oven comprises (a) a cooking chamber; (b) a steam generator in fluid communication with the cooking chamber, the steam generator configured to transform water into steam for delivery to the cooking chamber; (c) a water reservoir in fluid communication with the steam generator, the steam generator further configured to draw the water from the water reservoir to be transformed into the steam; (d) a water fill assembly in fluid communication with the water reservoir and configured to accept water from a source external to the oven that is subsequently deposited into the water reservoir; and (e) desiccant disposed in fluid communication between the water reservoir and the water fill assembly.

In embodiments, the oven further comprises a filter assembly disposed in fluid communication between the water reservoir and the water fill assembly. In embodiments, the desiccant is disposed within the filter assembly. In embodiments, the filter assembly further comprises a first mesh screen and a second mesh screen. In embodiments, the desiccant is disposed between, and maintained within the filter assembly by, the first mesh screen and the second mesh screen.

In embodiments, the oven further comprises a chassis comprising a wall that is oriented generally vertically. In embodiments, the water reservoir and the filter assembly are disposed on the wall of the chassis. In embodiments, the wall is a rear wall that is disposed rearward of the cooking chamber. In embodiments, the steam generator is disposed on the wall of the chassis.

In embodiments, the filter assembly further comprises a tubular element, the tubular element comprising (i) an exterior surface, (ii) an interior surface defining an interior flow channel, the desiccant disposed within the interior flow channel, (iii) a first end, (iv) a second end, (v) a first opening into the interior flow channel disposed at the first end in fluid communication with the water fill assembly, and (vi) a second opening into the interior flow channel disposed at the second end in fluid communication with the water reservoir. In embodiments, the interior flow channel is oriented generally vertically. In embodiments, the filter assembly further comprises (i) ridges that are outwardly extending and concentrically disposed at both the first end and the second end and (ii) an O-ring disposed at each of the first end and the second end between a pair of the ridges.

In embodiments, the oven further comprises water flowing from the water fill assembly, through the activated carbon, and into the water reservoir. In embodiments, the oven further comprises (i) water flowing from the water reservoir and to the steam generator and (ii) steam flowing from the steam generator and into the cooking chamber.

In embodiments, the desiccant comprises activated carbon. In embodiments, the desiccant comprises silica gel. In embodiments, the water fill assembly is disposed elevationally above the water reservoir and the desiccant.

In embodiments, the oven further comprises a chassis structurally supporting the steam generator, the water reservoir, and the water fill assembly. In embodiments, (i) the water fill assembly comprises a water storage chamber, an inlet into the water storage chamber, an outlet in fluid communication with the water reservoir, a fillable state, and a water supply state, (ii) in the fillable state, the water fill assembly is at least partially extracted from the chassis relative to the water supply state, and the inlet is accessible from an external environment for a user to deposit water into the water storage chamber through the inlet, and (iii) in the water supply state, the water fill assembly is inserted further into the oven than in the fillable state, and the inlet is not accessible from the external environment for the user to deposit water into the water storage chamber through the inlet.

According to another aspect of the present disclosure, an oven comprises: (1) a cooking chamber; (2) a chassis at least partially surrounding the cooking chamber; (3) door coupled to the chassis, the door selectively denying or allowing access to the cooking chamber from an environment external to the oven; (4) a steam generator coupled to the chassis, the steam generator in fluid communication with the cooking chamber and configured to transform water into steam for delivery to the cooking chamber; (5) a water reservoir coupled to the chassis, the water reservoir in fluid communication with the steam generator, the steam generator further configured to draw the water from the water reservoir to be transformed into the steam; (6) a water fill assembly coupled to the chassis, the water fill assembly in fluid communication with the water reservoir and configured to accept water from a source external to the oven that is subsequently deposited into the water reservoir; and (7) a filter assembly disposed in fluid communication between the water reservoir and the water fill assembly, the filter assembly comprising (a) a tubular element comprising (i) an exterior surface, (ii) an interior surface defining an interior flow channel, (iii) a first end, (iv) a second end, (v) a first opening into the interior flow channel disposed at the first end in fluid communication with the water fill assembly, and (vi) a second opening into the interior flow channel disposed at the second end in fluid communication with the water reservoir; and (b) desiccant disposed within the interior flow channel of the tubular element.

In embodiments, the filter assembly further comprises (i) a first mesh screen disposed within the interior flow channel and (ii) a second mesh screen disposed within the interior flow channel. In embodiments, the desiccant is disposed between, and maintained within the filter assembly by, the first mesh screen and the second mesh screen.

In embodiments, the desiccant comprises activated carbon. In embodiments, the chassis comprises (i) a top wall disposed above the cooking chamber and (ii) a rear wall disposed rearward of both the door and the cooking chamber. In embodiments, the water reservoir is coupled to the rear wall of the chassis. In embodiments, the water fill assembly is coupled to the chassis at or above the top wall of the chassis.

According to yet another aspect of the present disclosure, an oven comprises: (1) a cooking chamber; (2) a chassis at least partially surrounding the cooking chamber; (3) a door coupled to the chassis, the door selectively denying or allowing access to the cooking chamber from an environment external to the oven; (4) a steam generator coupled to the chassis, the steam generator in fluid communication with the cooking chamber and configured to transform water into steam for delivery to the cooking chamber; (5) a water reservoir coupled to the chassis, the water reservoir in fluid communication with the steam generator, the steam generator further configured to draw the water from the water reservoir to be transformed into the steam; (6) a water fill assembly coupled to the chassis, the water fill assembly in fluid communication with the water reservoir and configured to accept water from a source external to the oven that is subsequently deposited into the water reservoir; and (7) a filter assembly disposed in fluid communication between the water reservoir and the water fill assembly, the filter assembly comprising (a) a tubular element comprising (i) an exterior surface, (ii) an interior surface defining an interior flow channel, (iii) a first end, (iv) a second end, (v) a first opening into the interior flow channel disposed at the first end in fluid communication with the water fill assembly, and (vi) a second opening into the interior flow channel disposed at the second end in fluid communication with the water reservoir; and (b) activated carbon disposed within the interior flow channel of the tubular element.

These and other features, advantages, and objects of the present disclosure will be further understood and appreciated by those skilled in the art by reference to the following specification, claims, and appended drawings.

Figure 1:
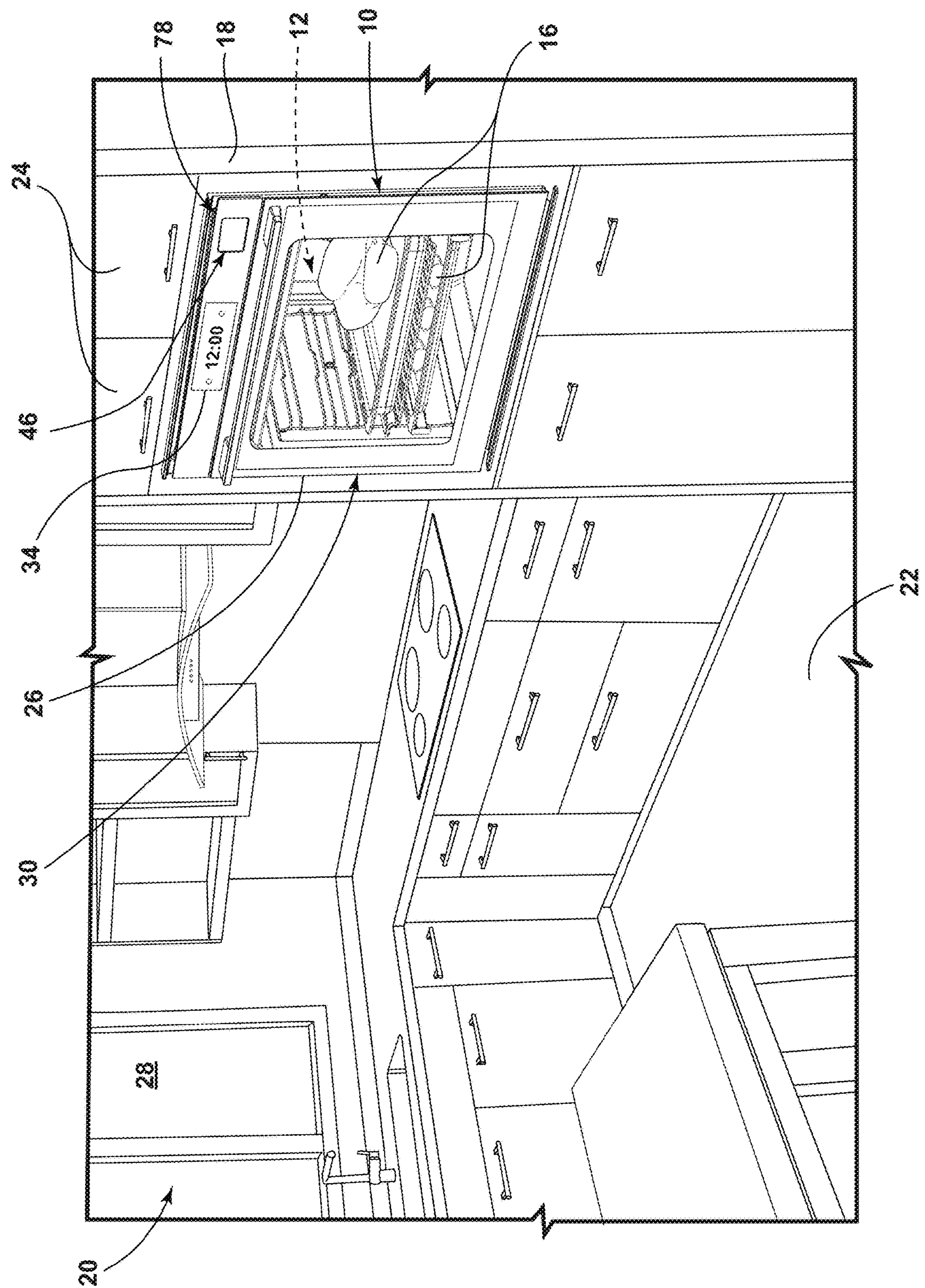
FIG. 1 is a perspective view of an oven of the disclosure disposed in a kitchen, illustrating an external environment disposed externally of the oven and the oven including a water fill assembly in a water supply state elevationally above a cooking chamber with one or more food items being prepared pursuant to a steam cooking function of the oven.

The components in the figures are not necessarily to scale, emphasis instead being placed upon illustrating the principles described herein.

DETAILED DESCRIPTION

The present illustrated embodiments reside primarily in combinations of method steps and apparatus components related to a food cooking oven. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprise the element.

Figure 2:
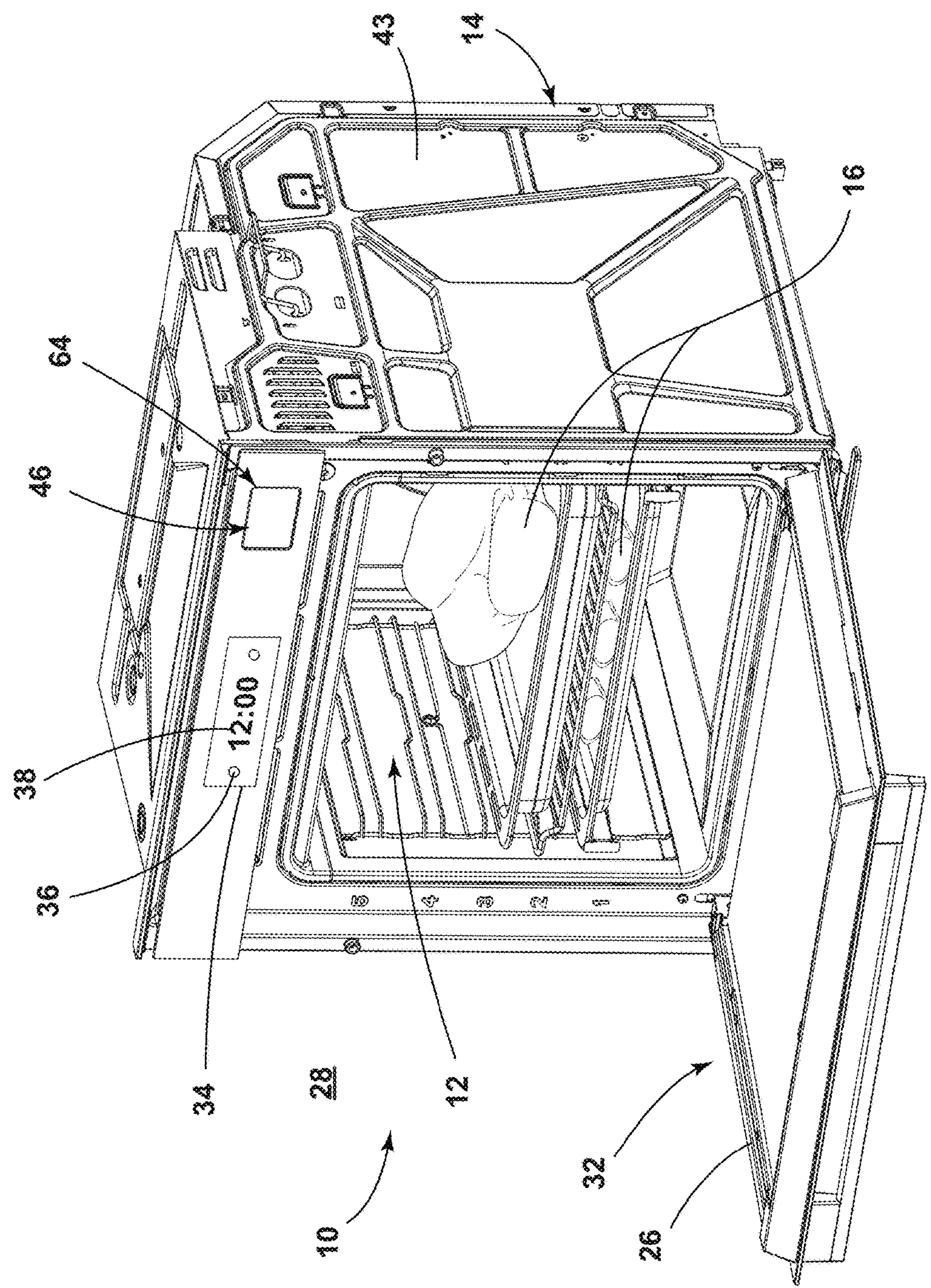
FIG. 2 is a perspective view of the oven of FIG. 1, illustrating a door of the oven in an open position revealing the cooking chamber and a chassis supporting an outer layer.

Referring to FIGS. 1 and 2, an oven 10 includes a cooking chamber 12 and a chassis 14 at least partially surrounding the cooking chamber 12. The oven 10 is configured to cook one or more food items 16 that are disposed within the cooking chamber 12, such as with a heating element that increases a temperature of the one or more food items 16 disposed within the cooking chamber 12 via electrical resistance, microwave emissions, or the combustion of a gas (e.g., natural gas, propane, butane, and so on). The oven 10 may be considered to be a "wall oven," as illustrated at FIG. 1, where the chassis 14 of the oven 10 is mostly hidden behind paneling 18 or other structural features of a kitchen 20 or another room where the oven 10 is disposed. The oven 10 may be elevated in such instances from a floor 22 of the kitchen 20 or another room where the oven 10 is disposed. In other embodiments, the oven 10 is part of a "range" unit and further includes a cooktop (not illustrated) disposed above the cooking chamber 12. In such embodiments, the oven 10 (i) may be of the "slide-in" variety where cabinetry 24, the paneling 18, or other structural features within the kitchen 20 (or other room) generally hide the chassis 14 of the oven 10, or (ii) may be of the "freestanding" variety where the cabinetry 24, the paneling 18, or other structural features of the kitchen 20 (or other room) do not hide the chassis 14 of the oven 10 but, rather, a covering (not illustrated) covers the chassis 14 of the oven 10.

The oven 10 further includes a door 26 coupled to the chassis 14 to selectively deny or allow access to the cooking chamber 12 from an environment 28 external to the oven 10. The door 26 includes a closed position 30 (FIG. 1) where the door 26 denies access to the cooking chamber 12 from the external environment 28. In addition, the door 26 includes an open position 32 (see, e.g., FIG. 2) where the door 26 allows access to the cooking chamber 12 from the external environment 28. The door 26 is able to move to, from, and between the closed position 30 and the open position 32. The door 26 may be in the closed position 30 while the oven 10 is cooking the one or more food items 16, so that the cooking chamber 12 better retains heat that the oven 10 generates. A user of the oven 10 may transition the door 26 from the closed position 30 to the open position 32 to place the one or more food items 16 into the cooking chamber 12 or to remove the one or more food items 16 from the cooking chamber 12, such as after the oven 10 has cooked the one or more food items 16.

In embodiments, the oven 10 further includes a human-machine interface 34. The human-machine interface 34 may include buttons 36, a touch screen display 38, among other items, that allow the user to control operation of the oven 10. The human-machine interface 34 is usable from the external environment 28, and, in embodiments, is disposed above the door 26.

Figure 3:
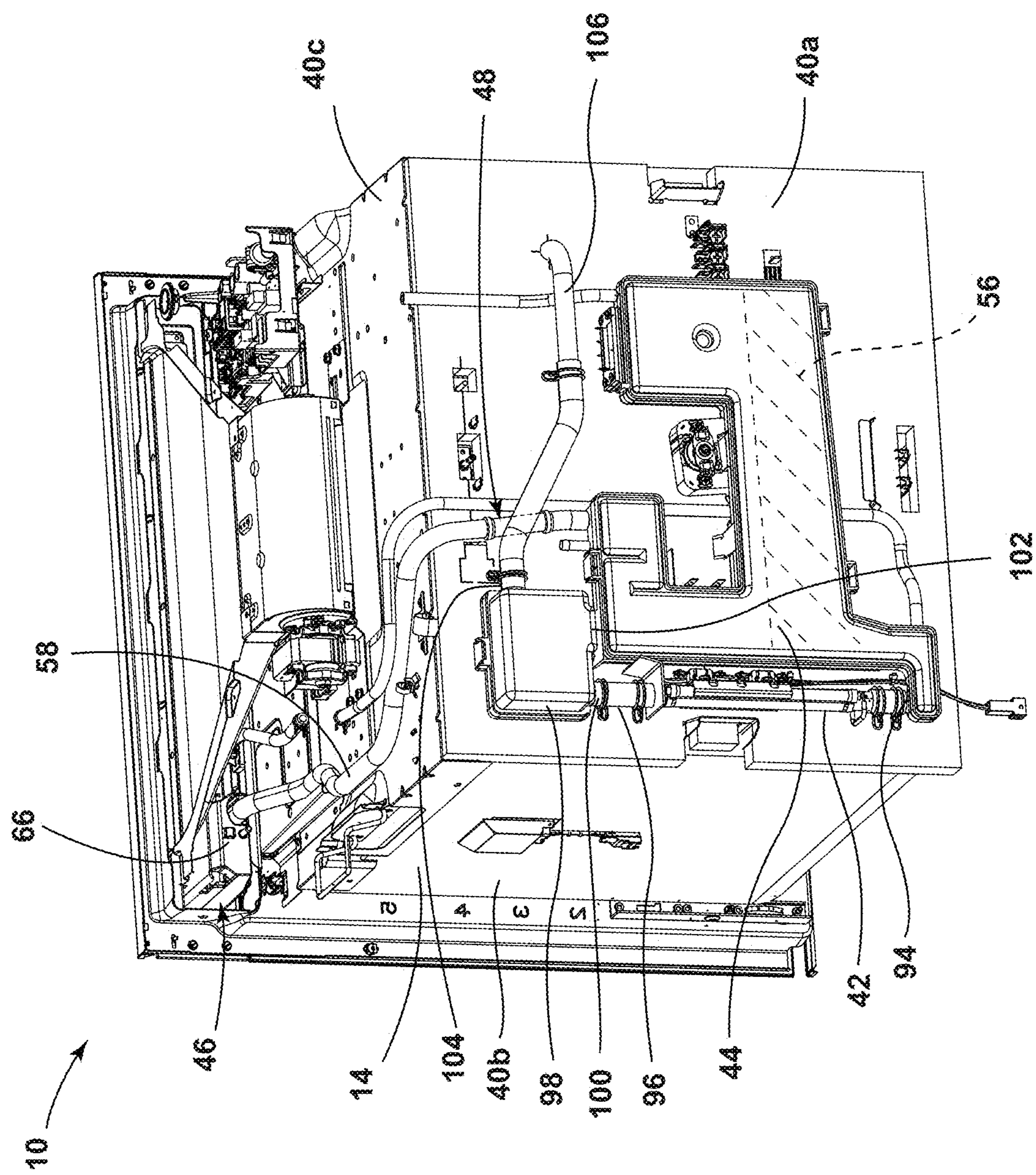
FIG. 3 is a rear perspective view of the oven of FIG. 1, illustrating the water fill assembly in fluid communication via tubing with a filter assembly, which is in fluid communication with a water reservoir, which is in fluid communication with a steam generator, which is in fluid communication with the cooking chamber via a phase separator and additional tubing.

Referring now to FIG. 3, the chassis 14 includes walls 40. In embodiments, the walls 40 support other components of the oven 10. In embodiments, one or more of the walls 40 of the chassis 14 are oriented generally vertically, such as a rear wall 40*a* disposed rearward of both the cooking chamber 12 and the door 26, and a side wall 40*b* that is disposed laterally outward from the cooking chamber 12. In embodiments, one or more walls 40 of the chassis 14 are oriented generally horizontally, such as a top wall 40*c* disposed above the cooking chamber 12. In embodiments, the chassis 14 further includes an outer layer 43 that covers the one or more walls 40 and the components of the oven 10 coupled thereto.

The oven 10 further includes a steam generator 42, a water reservoir 44, a water fill assembly 46, and a filter assembly 48 that are coupled to the chassis 14. The chassis 14 structurally supports, either directly or indirectly, the steam generator 42, the water reservoir 44, the water fill assembly 46, and the filter assembly 48.

Figure 4:
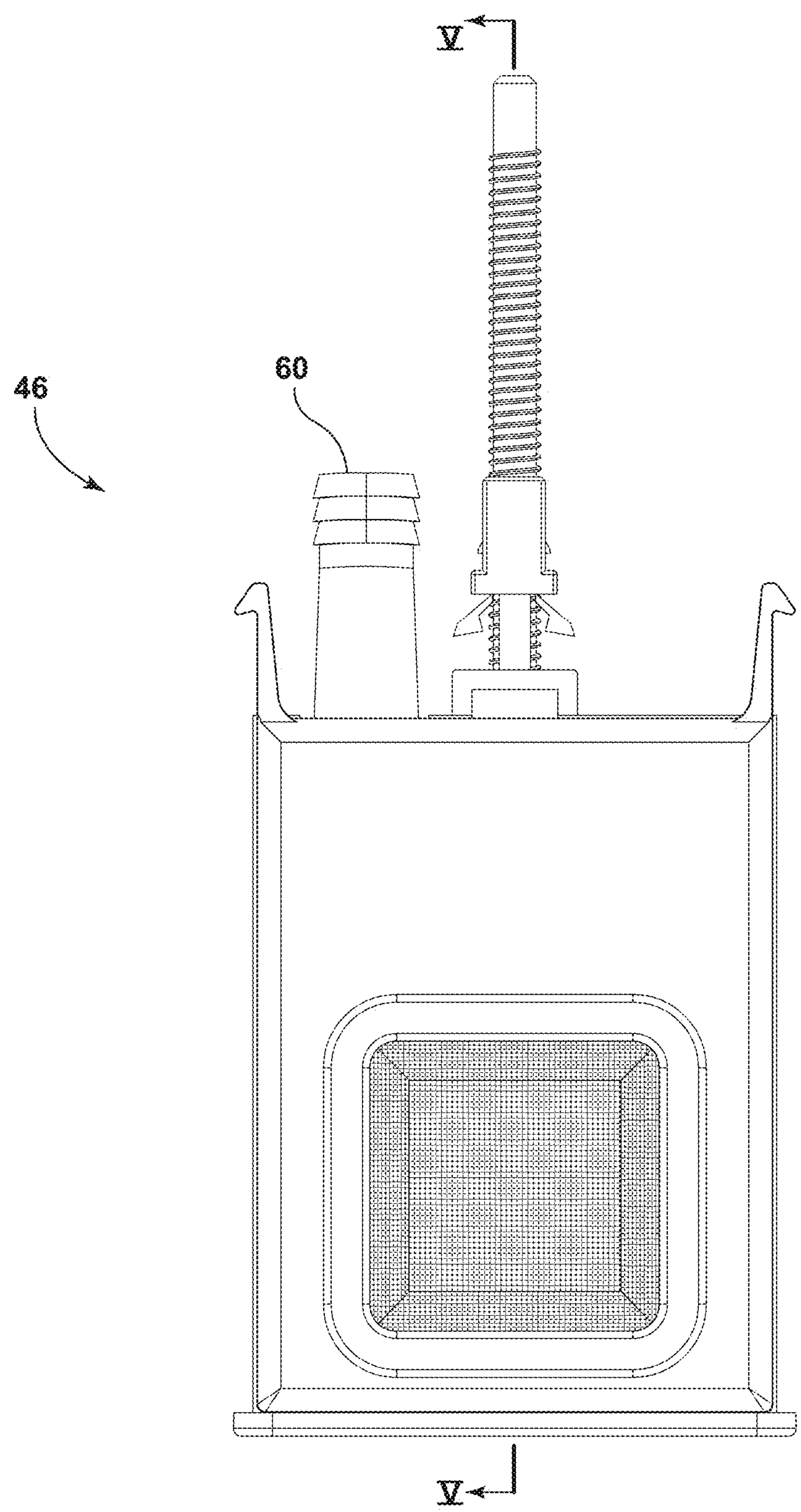
FIG. 4 is a top view of the water fill assembly of FIG. 1, illustrating a conduit to be coupled to the tubing in fluid communication with the filter assembly.
Figure 5:
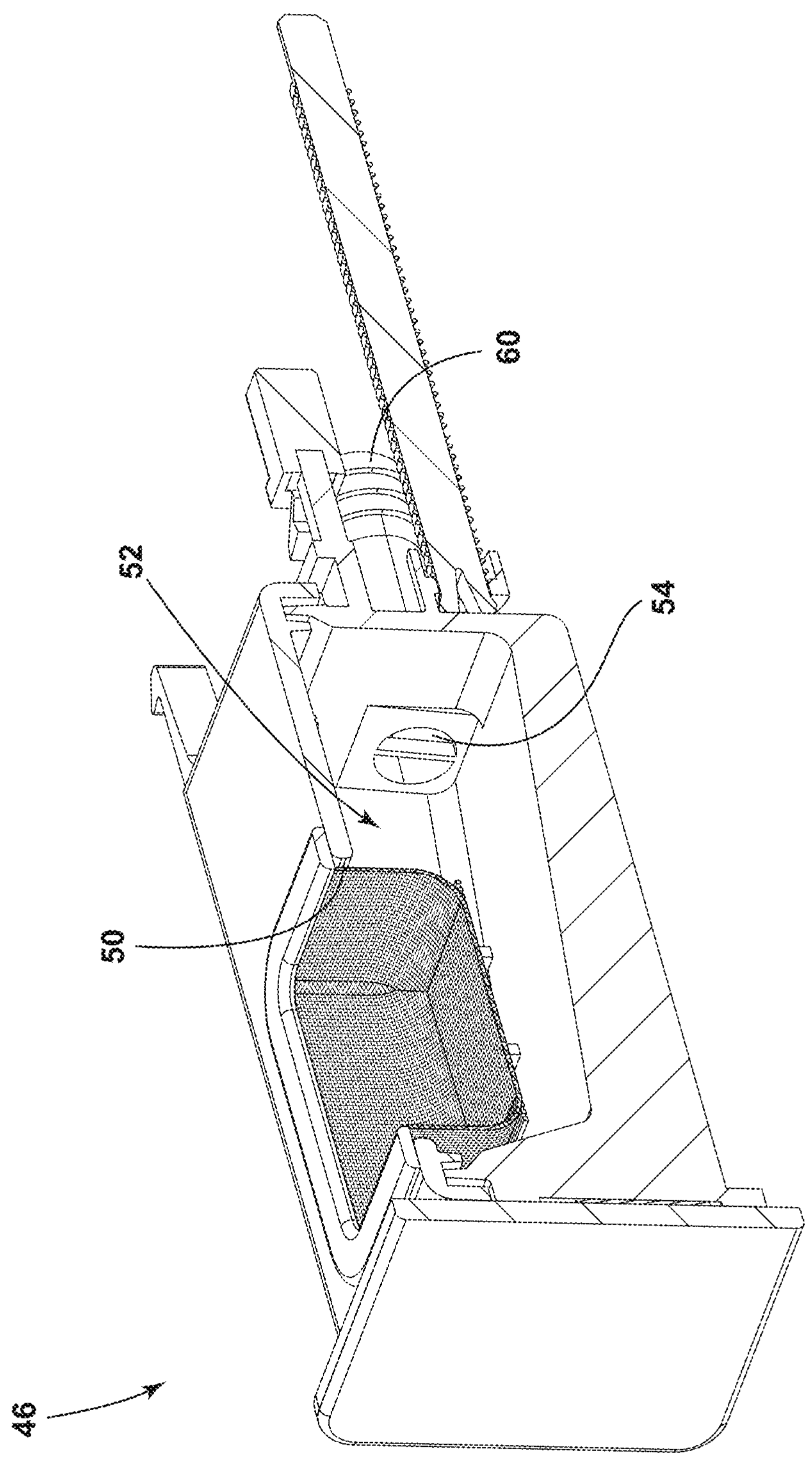
FIG. 5 is a perspective view of a cross-section of the water fill assembly of FIG. 1 taken through line V-V of FIG. 4, illustrating an inlet in communication with a water storage chamber, which is in fluid communication with an outlet leading to the conduit.

Referring additionally to FIGS. 4 and 5, the water fill assembly 46 is for use with a steam cooking function of the oven 10. The water fill assembly 46 is in fluid communication with the water reservoir 44. The water fill assembly 46 includes an inlet 50, a water storage chamber 52, and an outlet 54. The inlet 50 leads to the water storage chamber 52. The inlet 50 is configured to accept water 56 from a source external to the oven 10 that subsequently flows into the water storage chamber 52 and is subsequently deposited into the water reservoir 44. For example, the inlet 50 is disposed elevationally above the water storage chamber 52 so that gravity forces the water 56 to flow through the inlet 50 into the water storage chamber 52. The user deposits water 56 through the inlet 50 of the water storage chamber 52 and the water 56 enters the water storage chamber 52. The outlet 54 is in fluid communication with the water reservoir 44 via tubing 58 (see FIG. 3). In embodiments, the water fill assembly 46 further includes a conduit 60, which is in fluid communication with the outlet 54. The water flows from the water storage chamber 52, into the outlet 54, through the conduit 60 into the tubing 58, which is connected to the conduit 60, through the filter assembly 48 via the tubing 58, and then into the water reservoir 44 via the tubing 58. In embodiments, such as the embodiments illustrated, the water fill assembly 46 is disposed elevationally above the water reservoir 44 and the filter assembly 48, which allows the water 56 added to the water fill assembly 46 to flow via the force of gravity through the filter assembly 48 and into the water reservoir 44.

Figure 6:
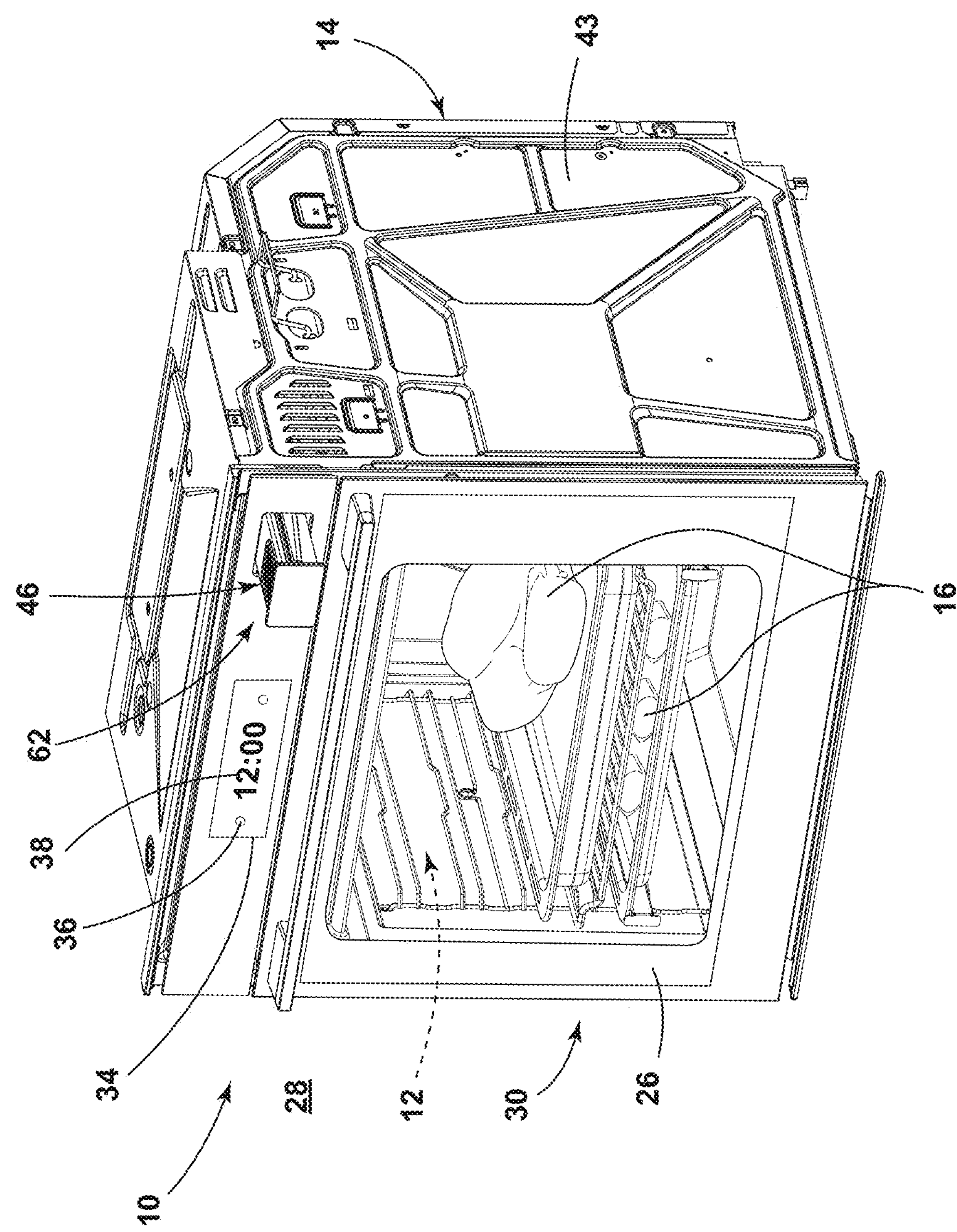
FIG. 6 is a perspective view of the oven of FIG. 1, illustrating the water fill assembly in a fillable state extracted from the oven to allow a user to deposit water into the water fill assembly for subsequent use in the steam cooking function of the oven.

Referring now additionally to FIG. 6, in embodiments, the water fill assembly 46 moves to, from, and between a fillable state 62 (see FIG. 6) and a water supply state 64 (see FIG. 2). In the fillable state 62, the water fill assembly 46 is at least partially extracted from the chassis 14 relative to the water supply state 64. When at least partially extracted from the chassis 14, the inlet 50 of the water fill assembly 46 is accessible from the external environment 28 to allow the user to deposit the water 56 into the water storage chamber 52 of the water fill assembly 46, and thus the water reservoir 44, through the inlet 50 of the water fill assembly 46. In embodiments, the water fill assembly 46 is fully extracted from the remainder of the oven 10 in the fillable state 62.

In the water supply state 64, the water fill assembly 46 is inserted further into the oven 10, such as further into the chassis 14, than when in the fillable state 62. In embodiments, in the water supply state 64, the inlet 50 of the water fill assembly 46 is not accessible from the external environment 28 for the user to deposit the water 56 into the water storage chamber 52 of the water fill assembly 46 through the inlet 50. In embodiments, such as illustrated, the oven 10 further includes a housing 66 (see FIG. 3) for the water fill assembly 46 that is coupled to the chassis 14, such as above the cooking chamber 12 or above the top wall 40*c* of the chassis 14. The housing 66 generally encloses the water fill assembly 46 when the water fill assembly 46 is in the water supply state 64, and provides a structural guide and support for the water fill assembly 46 as the water fill assembly 46 moves to, from, and between the fillable state 62 and the water supply state 64.

Figure 7:
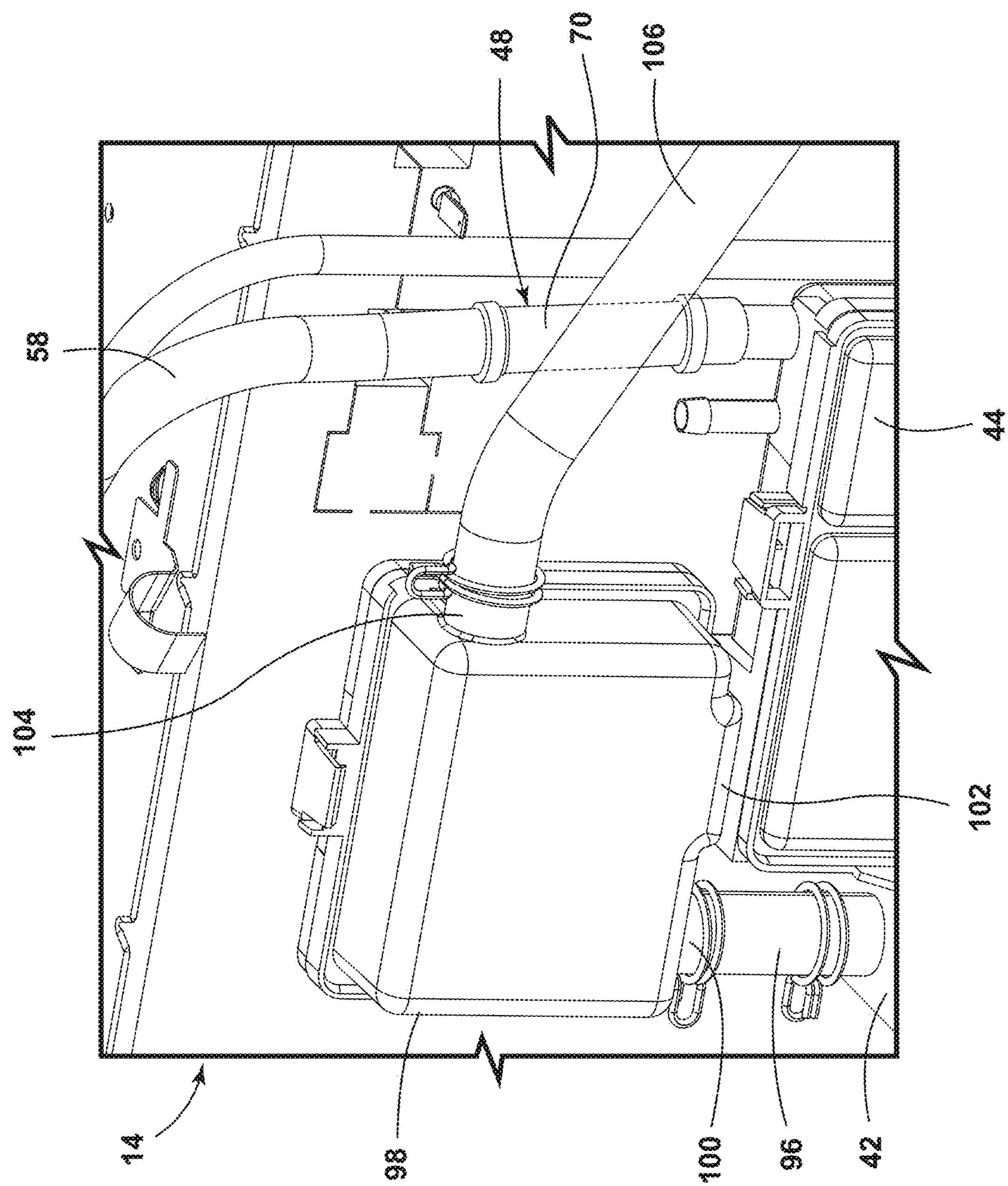
FIG. 7 is a magnified rear perspective view of the oven of FIG. 1, illustrating the filter assembly and the phase separator disposed elevationally above the water reservoir and the steam generator.
Figure 8:
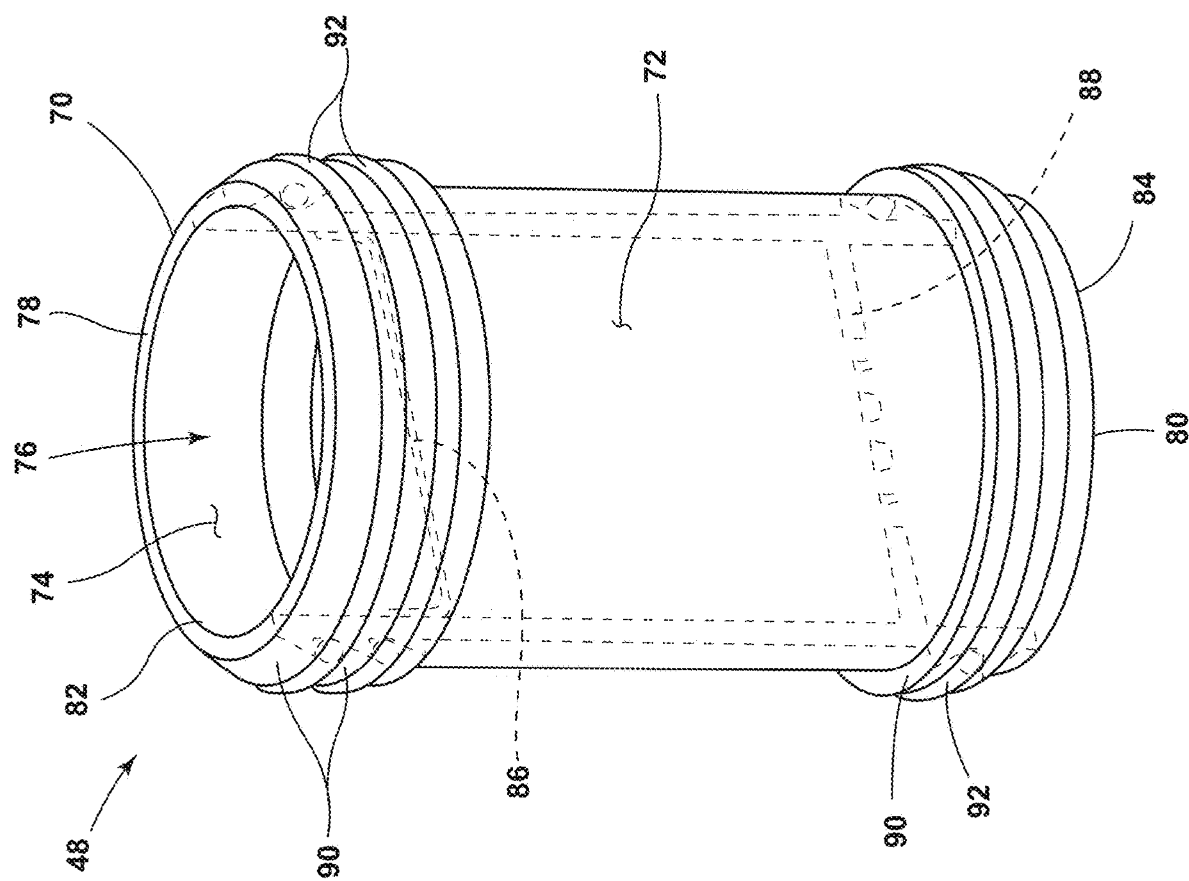
FIG. 8 is a perspective view of the filter assembly of FIG. 3, illustrating a tubular element with (i) an interior surface forming an interior flow channel and (ii) an exterior surface from which ridges extend to maintain O-rings in position at both a first end and a second end.
Figure 9:
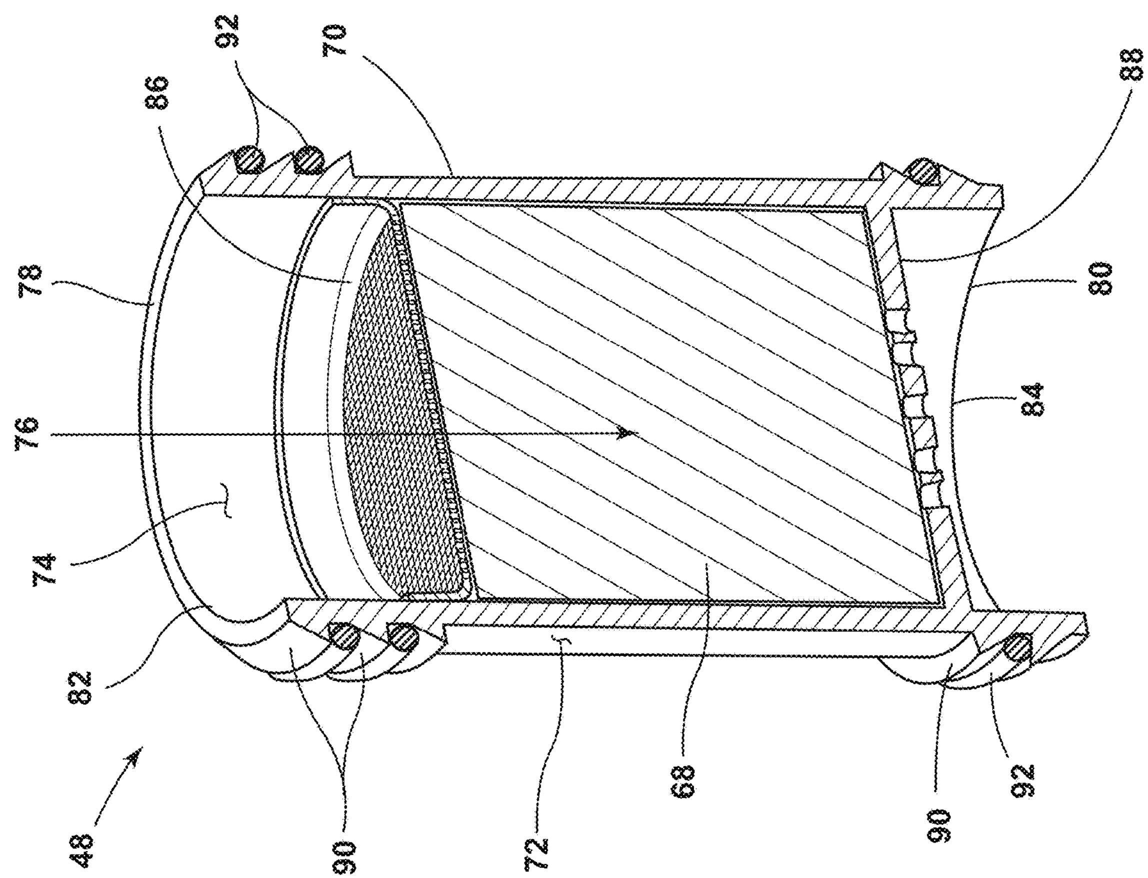
FIG. 9 is a perspective view of a cross-section of the filter assembly of FIG. 3, illustrating desiccant disposed between a first mesh screen and the second mesh screen within the interior flow channel of the tubular element, the desiccant operating to limit or prevent steam backflow from the steam generator to the external environment through the water fill assembly.

Referring now additionally to FIGS. 7-9, the filter assembly 48 is disposed in fluid communication between the water reservoir 44 and the water fill assembly 46. In embodiments, as mentioned, the water 56 added to the water fill assembly 46 flows through the filter assembly 48 to the water reservoir 44, such as via the tubing 58. In embodiments, the filter assembly 48 is disposed on one of the walls 40 of the chassis 14, such as rear vertical wall 40*a* of the chassis 14.

The filter assembly 48 includes a desiccant 68, and places the desiccant 68 in fluid communication between the water reservoir 44 and the water fill assembly 46. The desiccant 68 can be any hygroscopic solid. In embodiments, the desiccant 68 is selected from the group consisting of: silica gel, activated carbon (a/k/a activated charcoal), calcium sulfate, calcium chloride, and a zeolite. In embodiments, the desiccant 68 is or includes silica gel. In embodiments, the desiccant 68 is or includes activated carbon.

In embodiments, the filter assembly 48 further includes a tubular element 70, in which the desiccant 68 is housed and through which the water 56 flows from the water fill assembly 46 to the water reservoir 44. In embodiments, the tubular element 70 includes an exterior surface 72 and an interior surface 74 that defines an interior flow channel 76 and faces the desiccant 68. The desiccant 68 is disposed within the interior flow channel 76 of the filter assembly 48. The tubular element 70 further includes a first end 78, a second end 80, a first opening 82 into the interior flow channel 76 disposed at the first end 78, and a second opening 84 into the interior flow channel 76 disposed at the second end 80. The first opening 82 is in fluid communication with the water fill assembly 46, and the second opening 84 is in fluid communication with the water reservoir 44, such that water 56 flows from the water fill assembly 46 and into the interior flow channel 76 through the first opening 82 before flowing into the water reservoir 44 through the second opening 84. In embodiments, the interior flow channel 76 is oriented generally vertically. In embodiments, the water fill assembly 46 is disposed elevationally above the desiccant 68, allowing water to flow via the force of gravity from the water fill assembly 46, vertically downward through the desiccant 68 (e.g., activated carbon), and into the water reservoir 44.

In embodiments, the filter assembly 48 further includes a first mesh screen 86 and a second mesh screen 88. Both the first mesh screen 86 and the second mesh screen 88 are disposed within the interior flow channel 76. The interior surface 74 of the tubular element 70 surrounds both the first mesh screen 86 and the second mesh screen 88. The first mesh screen 86 is disposed closer to the first end 78 than the second mesh screen 88. The desiccant 68 is disposed between the first mesh screen 86 and the second mesh screen 88. The first mesh screen 86 and the second mesh screen 88 maintain the desiccant 68 within the interior flow channel 76 of the filter assembly 48.

In embodiments, the filter assembly 48 further includes ridges 90 disposed at both the first end 78 and the second end 80. The ridges 90 are outwardly extending and concentric. The filter assembly 48 can further include an O-ring 92 disposed at each of the first end 78 and the second end 80 between a pair of the ridges 90. The ridges 90 maintain the O-rings 92 in place. The O-rings 92 help maintain fluid connection between the filter assembly 48 and any tubing connected thereto, such as the tubing 58.

Referring back to FIG. 3, the water reservoir 44 is in fluid communication with the steam generator 42. In embodiments, the water reservoir 44 is coupled to the chassis 14. For example, the water reservoir 44 can be disposed on a wall 40 of the chassis 14, such as the rear vertical wall 40*a* of the chassis 14. In embodiments, the water reservoir 44 is disposed elevationally lower than the filter assembly 48, allowing the water 56 to flow from the filter assembly 48 into the water reservoir 44 via the force of gravity and without the aid of a pump, although a pump could be utilized. The water reservoir 44 is sealed, which prevents the water 56 from leaking out of the water reservoir 44 and onto the chassis 14.

The steam generator 42 is in fluid communication with the water reservoir 44 and is configured to draw the water 56 from the water reservoir 44 though a first end 94. In embodiments, the steam generator 42 is a boiler. In any event, the steam generator 42 includes a heating element that transforms at least a portion of the water 56 drawn from the water reservoir 44 into steam, which exits the steam generator 42 through a second end 96. The steam generator 42 is in fluid communication with the cooking chamber 12, and the steam that the steam generator 42 generates is delivered to the cooking chamber 12, such as for use during a steam cooking procedure.

In embodiments, the oven 10 further includes a phase separator 98. The phase separator 98 is in fluid communication with the steam generator 42 via an inlet 100. The steam generator 42 transforms the water 56 from the water reservoir 44 into a mixture of liquid water and steam, and the mixture flows to the phase separator 98 through the second end 96 of the steam generator 42 and the inlet 100 of the phase separator 98. The phase separator 98 separates the steam and the liquid water 56 from the mixture. The phase separator 98 further includes a first outlet 102 in communication with the water reservoir 44. Liquid water 56 from the mixture in the phase separator 98 flows back into the water reservoir 44 through the first outlet 102. The phase separator 98 further includes a second outlet 104 in communication with the cooking chamber 12, such as via tubing 106 that extends from the phase separator 98 into the cooking chamber 12. The steam is directed from the phase separator 98 to the cooking chamber 12 for use during a steam cooking procedure.

In use of the oven 10, the user causes the water fill assembly 46 to move to the fillable state 62. The user deposits water 56 into the water storage chamber 52 of the water fill assembly 46 through the inlet 50 of the water fill assembly 46. The user causes the water fill assembly 46 to move to the water supply state 64. The water 56 that the user deposited flows out of the outlet 54 of the water fill assembly 46, through tubing 58, and into the filter assembly 48. The water 56 subsequently flows from the filter assembly 48 into the water reservoir 44. The user causes the oven 10 to perform a steam cooking function on one or more food items 16 placed in the cooking chamber 12, such as via manipulation of the human-machine interface 34. The oven 10 causes the water 56 to flow from the water reservoir 44 and to the steam generator 42. The steam generator 42 generates steam from the water 56, which flows into the cooking chamber 12 with the one or more food items 16, such as through the phase separator 98 and the tubing 106.

During the steam cooking function or after the steam cooking function has completed, steam may attempt to flow back toward the external environment 28 through the water fill assembly 46. However, to flow to the water fill assembly 46, the steam must first flow through the filter assembly 48.

The desiccant 68 of the filter assembly 48, along with the first mesh screen 86 and the second mesh screen 88, act as a physical barrier that reduces the flow of the steam toward the water fill assembly 46. In addition, the desiccant 68 causes a portion of the steam to change phase into liquid water, which further reduces the flow of steam toward the water fill assembly 46. The phase separated water flows back into the water reservoir 44. Residual heat from the oven 10 causes the desiccant 68 subsequently to expel absorbed water, which allows the desiccant 68 to again block steam from flowing to the water fill assembly 46 and out of the oven 10 into the external environment 28. In embodiments, such as when the desiccant 68 includes activated carbon, the desiccant 68 provides the added benefit of deodorizing and filtering the water 56 that is subsequently utilized for the steam cooking function.

The invention disclosed herein is further summarized in the following paragraphs and is further characterized by combinations of any and all of the various aspects described therein.

According to a first aspect of the disclosure, an oven comprises (a) a cooking chamber; (b) a steam generator in fluid communication with the cooking chamber, the steam generator configured to transform water into steam for delivery to the cooking chamber; (c) a water reservoir in fluid communication with the steam generator, the steam generator further configured to draw the water from the water reservoir to be transformed into the steam; (d) a water fill assembly in fluid communication with the water reservoir and configured to accept water from a source external to the oven that is subsequently deposited into the water reservoir; and (e) desiccant disposed in fluid communication between the water reservoir and the water fill assembly.

According to a second aspect of the disclosure, the oven of the first aspect further comprises a filter assembly disposed in fluid communication between the water reservoir and the water fill assembly, wherein, the desiccant is disposed within the filter assembly.

According to a third aspect of the disclosure, the oven of the second aspect, wherein (i) the filter assembly further comprises a first mesh screen and a second mesh screen, and (ii) the desiccant is disposed between, and maintained within, the filter assembly by the first mesh screen and the second mesh screen.

According to a fourth aspect of the disclosure, the oven of any one of the second and third aspects further comprises a chassis comprising a wall that is oriented generally vertically, wherein, the water reservoir and the filter assembly are disposed on the wall of the chassis.

According to a fifth aspect of the disclosure, the oven of the fourth aspect, wherein the wall is a rear wall that is disposed rearward of the cooking chamber.

According to a sixth aspect of the disclosure, the oven of any one of the fourth through fifth aspects, wherein the steam generator is disposed on the wall of the chassis.

According to a seventh aspect of the disclosure, the oven of any one of the second through sixth aspects, wherein the filter assembly further comprises a tubular element, the tubular element comprising (i) an exterior surface, (ii) an interior surface defining an interior flow channel, the desiccant disposed within the interior flow channel, (iii) a first end, (iv) a second end, (v) a first opening into the interior flow channel disposed at the first end in fluid communication with the water fill assembly, and (vi) a second opening into the interior flow channel disposed at the second end in fluid communication with the water reservoir.

According to an eighth aspect of the disclosure, the oven of the seventh aspect, wherein the interior flow channel is oriented generally vertically.

According to a ninth aspect of the disclosure, the oven of any one of the seventh through eighth aspects, wherein the filter assembly further comprises (i) ridges that are outwardly extending and concentrically disposed at both the first end and the second end and (ii) an O-ring disposed at each of the first end and the second end between a pair of the ridges.

According to a tenth aspect of the disclosure, the oven of any one of the first through ninth aspects further comprises water flowing from the water fill assembly, through the activated carbon, and into the water reservoir.

According to an eleventh aspect of the disclosure, the oven of any one of the first through tenth aspects further comprises (i) water flowing from the water reservoir and to the steam generator and (ii) steam flowing from the steam generator and into the cooking chamber.

According to a twelfth aspect of the disclosure, the oven of any one of the first through eleventh aspects, wherein the desiccant comprises activated carbon.

According to a thirteenth aspect of the disclosure, the oven of any one of the first through twelfth aspects, wherein the desiccant comprises silica gel.

According to a fourteenth aspect of the disclosure, the oven of any one of the first through thirteenth aspects, wherein the water fill assembly is disposed elevationally above the water reservoir and the desiccant.

According to a fifteenth aspect of the disclosure, the oven of any one of the first through fourteenth aspects further comprises a chassis structurally supporting the steam generator, the water reservoir, and the water fill assembly; wherein (i) the water fill assembly comprises a water storage chamber, an inlet into the water storage chamber, an outlet in fluid communication with the water reservoir, a fillable state, and a water supply state, (ii) in the fillable state, the water fill assembly is at least partially extracted from the chassis relative to the water supply state, and the inlet is accessible from an external environment for a user to deposit water into the water storage chamber through the inlet, and (iii) in the water supply state, the water fill assembly is inserted further into the oven than in the fillable state, and the inlet is not accessible from the external environment for the user to deposit water into the water storage chamber through the inlet.

According to a sixteenth aspect of the disclosure, an oven comprises: (1) a cooking chamber; (2) a chassis at least partially surrounding the cooking chamber; (3) a door coupled to the chassis, the door selectively denying or allowing access to the cooking chamber from an environment external to the oven; (4) a steam generator coupled to the chassis, the steam generator in fluid communication with the cooking chamber and configured to transform water into steam for delivery to the cooking chamber; (5) a water reservoir coupled to the chassis, the water reservoir in fluid communication with the steam generator, the steam generator further configured to draw the water from the water reservoir to be transformed into the steam; (6) a water fill assembly coupled to the chassis, the water fill assembly in fluid communication with the water reservoir and configured to accept water from a source external to the oven that is subsequently deposited into the water reservoir; and (7) a filter assembly disposed in fluid communication between the water reservoir and the water fill assembly, the filter assembly comprising (a) a tubular element comprising (i) an exterior surface, (ii) an interior surface defining an interior flow channel, (iii) a first end, (iv) a second end, (v) a first opening into the interior flow channel disposed at the first end in fluid communication with the water fill assembly, and (vi) a second opening into the interior flow channel disposed at the second end in fluid communication with the water reservoir; and (b) desiccant disposed within the interior flow channel of the tubular element.

According to a seventeenth aspect of the disclosure, the oven of the sixteenth aspect, wherein (a) the filter assembly further comprises (i) a first mesh screen disposed within the interior flow channel and (ii) a second mesh screen disposed within the interior flow channel; and (b) the desiccant is disposed between, and maintained within, the filter assembly by the first mesh screen and the second mesh screen.

According to an eighteenth aspect of the disclosure, the oven of any one of the sixteenth through seventeenth aspects, wherein the desiccant comprises activated carbon.

According to a nineteenth aspect of the disclosure, the oven of any one of the sixteenth through eighteenth aspects, wherein (a) the chassis comprises (i) a top wall disposed above the cooking chamber and (ii) a rear wall disposed rearward of both the door and the cooking chamber; (b) the water reservoir is coupled to the rear wall of the chassis; and (c) the water fill assembly is coupled to the chassis at or above the top wall of the chassis.

According to a twentieth aspect of the disclosure, an oven comprises: (1) a cooking chamber; (2) a chassis at least partially surrounding the cooking chamber; (3) a door coupled to the chassis, the door selectively denying or allowing access to the cooking chamber from an environment external to the oven; (4) a steam generator coupled to the chassis, the steam generator in fluid communication with the cooking chamber and configured to transform water into steam for delivery to the cooking chamber; (5) a water reservoir coupled to the chassis, the water reservoir in fluid communication with the steam generator, the steam generator further configured to draw the water from the water reservoir to be transformed into the steam; (6) a water fill assembly coupled to the chassis, the water fill assembly in fluid communication with the water reservoir and configured to accept water from a source external to the oven that is subsequently deposited into the water reservoir; and (7) a filter assembly disposed in fluid communication between the water reservoir and the water fill assembly, the filter assembly comprising (a) a tubular element comprising (i) an exterior surface, (ii) an interior surface defining an interior flow channel, (iii) a first end, (iv) a second end, (v) a first opening into the interior flow channel disposed at the first end in fluid communication with the water fill assembly, and (vi) a second opening into the interior flow channel disposed at the second end in fluid communication with the water reservoir; and (b) activated carbon disposed within the interior flow channel of the tubular element.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An oven comprising:

a cooking chamber;

a steam generator in fluid communication with the cooking chamber, the steam generator configured to transform water into steam for delivery to the cooking chamber;

a water reservoir in fluid communication with the steam generator, the steam generator further configured to draw the water from the water reservoir to be transformed into the steam;

a water fill assembly in fluid communication with the water reservoir and configured to accept water from a source external to the oven that is subsequently deposited into the water reservoir; and a filter assembly disposed in fluid communication between the water reservoir and the water fill assembly, the filter assembly comprising a tubular element comprising (i) an exterior surface, (ii) an interior surface defining an interior flow channel, (iii) desiccant disposed within the interior flow channel, (iv) a first end, (v) a second end disposed vertically below the first end, wherein the interior flow channel extends from the first end to the second end, (vi) a first opening into the interior flow channel disposed at the first end in fluid communication with the water fill assembly, (vii) a second opening into the interior flow channel disposed at the second end in fluid communication with the water reservoir;

(viii) ridges that are outwardly extending and concentrically disposed at both the first end and the second end, and (ix) an O-ring disposed at each of the first end and the second end between a pair of the ridges, wherein both the O-ring disposed at the first end and the O-ring disposed at the second end are disposed radially outward relative to the interior surface defining the interior flow channel.

2. The oven of claim 1, wherein the filter assembly is oriented so that water deposited into the water fill assembly flows vertically downward through the interior flow channel of the filter assembly before reaching the water reservoir.

3. The oven of claim 1, wherein the filter assembly further comprises a first mesh screen and a second mesh screen, and the desiccant is disposed between, and maintained within, the filter assembly by the first mesh screen and the second mesh screen.

4. The oven of claim 1 further comprising: a chassis comprising a wall that is oriented generally vertically, wherein, the water reservoir and the filter assembly are disposed on the wall of the chassis.

5. The oven of claim 4, wherein the wall is a rear wall that is disposed rearward of the cooking chamber.

6. The oven of claim 4, wherein the steam generator is disposed on the wall of the chassis.

7. The oven of claim 3, wherein the first mesh screen comprises a mesh portion through which water can flow that is orthogonal to the interior surface of the tubular element defining the interior flow channel.

8. The oven of claim 1, wherein the interior flow channel is oriented generally vertically.

9. The oven of claim 7, wherein the first mesh screen further comprises a flange that is disposed orthogonal to the mesh portion.

10. The oven of claim 1, wherein water is configured to flow from the water fill assembly, through the desiccant, and into the water reservoir.

11. The oven of claim 1, wherein water is configured to flow from the water reservoir and to the steam generator; and steam is configured to flow from the steam generator and into the cooking chamber.

12. The oven of claim 1, wherein the desiccant comprises activated carbon.

13. The oven of claim 1, wherein the desiccant comprises silica gel.

14. The oven of claim 1, wherein the water fill assembly is disposed elevationally above the water reservoir and the desiccant.

15. The oven of claim 1 further comprising: a chassis structurally supporting the steam generator, the water reservoir, and the water fill assembly; wherein, the water fill assembly comprises a water storage chamber, an inlet into the water storage chamber, an outlet in fluid communication with the water reservoir, a fillable state, and a water supply state; wherein, in the fillable state, the water fill assembly is at least partially extracted from the chassis relative to the water supply state and the inlet is accessible from an external environment for a user to deposit water into the water storage chamber through the inlet; and wherein, in the water supply state, the water fill assembly is inserted further into the oven than in the fillable state and the inlet is not accessible from the external environment for the user to deposit water into the water storage chamber through the inlet.

16. The oven of claim 1 further comprising: a chassis at least partially surrounding the cooking chamber; and a door coupled to the chassis, the door selectively denying or allowing access to the cooking chamber from an environment external to the oven; wherein, the steam generator is coupled to the chassis; wherein, the water reservoir is coupled to the chassis; and wherein, the water fill assembly is coupled to the chassis.

17. The oven of claim 9, wherein the flange of the first mesh screen extends away from the desiccant toward the first end of the tubular element.

18. The oven of claim 9, wherein the flange of the first mesh screen is disposed flush against the interior surface of the tubular element.

19. The oven of claim 16, wherein the chassis comprises (i) a top wall disposed above the cooking chamber and (ii) a rear wall disposed rearward of both the door and the cooking chamber; the water reservoir and the filter assembly are is-coupled to the rear wall of the chassis; and the water fill assembly is coupled to the chassis at or above the top wall of the chassis.

20. The oven of claim 9, wherein the second mesh screen is integral with the tubular element providing the interior surface.

* * * * *